UNITED STATES PATENT OFFICE.

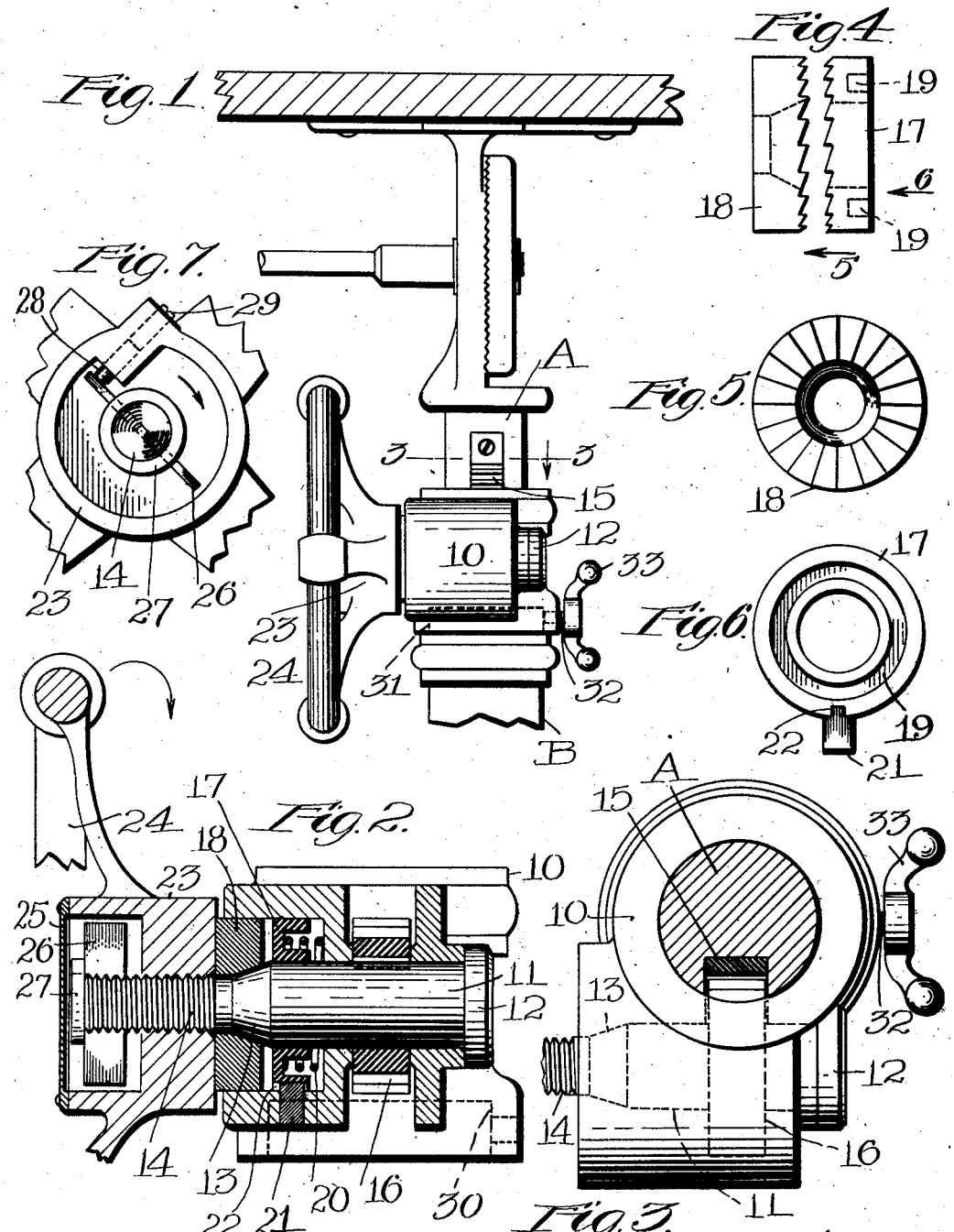

WILLIAM W. BIRD AND LOUIS W. RAWSON, OF WORCESTER, MASSACHUSETTS, ASSIGNORS TO WORCESTER POLYTECHNIC INSTITUTE, A CORPORATION OF MASSACHUSETTS.

RAISING AND LOWERING MECHANISM.

1,010,574.  Specification of Letters Patent.  Patented Dec. 5, 1911.

Application filed January 18, 1909. Serial No. 472,838.

*To all whom it may concern:*

Be it known that we, WILLIAM W. BIRD and LOUIS W. RAWSON, citizens of the United States, residing of Worcester, in the county of Worcester and State of Massachusetts, have invented a new and useful Raising and Lowering Mechanism, of which the following is a specification.

The object of this invention is to provide a new and improved raising and lowering mechanism whereby a part may be raised or lowered simply by manipulating an operating means such as a handle, which mechanism will lock when going down even without a load and hold the part to be raised or lowered in adjusted position.

The invention is particularly applicable as a means for raising and lowering spindles such as are used under drawing stands, tables, cameras, etc.

The improved mechanism comprises a shaft, connections such as gearing therefrom to the part to be raised and lowered, a non-rotating clutch or pawl member, a rotating clutch or ratchet member having an engagement with said non-rotating member which allows rotation in one direction but restrains rotation in the other direction, said rotating member also having a locking engagement with said shaft, and operating connections which continue the locking engagement between the rotating member and shaft when turned in one direction but release said rotating member from the shaft when turned in the other direction. The locking engagement between the rotating member and shaft is preferably a friction engagement and the operating connections preferably comprise a hub screw-threaded on said shaft, which hub engages with the rotating member, which hub is provided with an operating handle or lever. A spring or tension device is also provided which tends normally to rotate the hub on the shaft in a direction to lock the rotating member in engagement with the shaft. By this arrangement, when it is desired to raise or lower the spindle, all that is necessary is to turn the wheel or handle in one direction or the other and thereby move the spindle to the desired vertical position, in which position it will be locked until the wheel or handle is again turned.

In the drawing, the invention is illustrated as applied to the spindle of a drawing stand.

Referring to the drawing and in detail, Figure 1 is a front elevation of the mechanism. Fig. 2 is an enlarged central cross-sectional view. Fig. 3 is an enlarged partially cross-sectional view taken on the line 3—3 of Fig. 1. Fig. 4 is a side elevation of the rotating and non-rotating clutch members. Fig. 5 is an elevation of the rotating member looking in the direction indicated by the arrow 5 in Fig. 4. Fig. 6 is an elevation of the non-rotating clutch member looking in the direction indicated by the arrow 6 in Fig. 4, and Fig. 7 is a view of the operating hub with the cap removed.

The invention will be best understood by a detailed description of the mechanism shown.

Referring to the drawing and in detail, A designates the spindle and B the base of a drawing stand or similar article. Fitted on the spindle is a hub or block 10. Journaled in this hub is a shaft 11 which is provided with a collar 12 at one end, a friction or conical shoulder 13 and screw-threads 14 at its other end. Operating connections are provided between the shaft and spindle which connections preferably comprise a rack 15 set into and secured in a slot cut in the spindle A and a pinion 16 keyed or secured on said shaft 11. The hub 10 is provided with a chamber or recess at one side and fitted therein are the non-rotating and rotating clutch members 17 and 18. The clutch members are provided with engaging teeth and notches which form ratchet teeth in effect. The non-rotating member 17 has a groove 19 in its rear face and fitted in the same as a spring 20 which bears on the inside of the recess in the hub and thus tends normally to press the non-rotating member 17 to the left as shown in Fig. 2. The member 17 is held from rotation by a key or pin 21 which is secured in the hub 10 and which engages a slot 22 cut in the member 17. This engagement holds the member 17 from rotation but allows the same to move axially.

The rotating clutch member 18 has a conical hole in the same shaped to engage and lock on the shoulder 13 on the shaft 11. By this arrangement, it will be seen that the connection between the members 17 and 18 is practically a pawl and ratchet connection which allows rotation of the member 18 relatively to the member 17 in one direction but restrains its rotation in the other direction.

Fitted on the screw-threads 14 of the shaft 11 is a hub 23 which may be provided with an operating handle or wheel 24. The hub 23 is chambered out and a cap 25 is secured to the face thereof to cover the recess. The end of the shaft 11 is slotted and fitted in the slot is a leaf spring 26 which is held in place by a small nut 27 threaded on the end of the shaft 11. Engaging the leaf spring 26 is a screw 28 threaded into the hub 23 and a locking screw 29 is also preferably threaded into said hub to hold the screw 28 in adjusted position. By this arrangement, the hub 23 will normally tend to turn on the shaft in the direction indicated by the arrow in Fig. 7.

The bottom of the hub 10 is chambered or cut away as at 30 to engage a shoulder 31 on the base B and a screw 32 provided with a handle 33 is threaded into the hub 10 so that the spindle can be restrained from rotation relatively to the base B.

It will be seen that the spring 26 normally tends to turn the hub 23 relatively to the shaft 11 in the direction indicated by the arrow in Fig. 2. This tends to screw the hub 23 up on the shaft and lock the rotating clutch member 18 to the shaft so that the engagement of the rotating clutch member 18 with the non-rotating member 17 holds the spindle from downward movement in the base at all times, even when there is no load on the spindle. Now when it is desired to lift the spindle, the hand-wheel is turned in the direction indicated by the arrow in Fig. 2 which will continue the locking engagement between the rotating member 18 and the shaft 11 and which rotation through the operating rack 15 and pinion 16 will raise the spindle. It will be noted that this movement is permitted as the engagement between the members 17 and 18 is in effect a ratchet and pawl engagement, the member 18 forming a ratchet and the member 17 forming a pawl which permits this rotation of the member 18, the ratchet action between the teeth being allowed by the axial movement of the member 17 against its spring 20, which spring 20 otherwise keeps the teeth of the two members in engagement and thereby locks the spindle from downward movement.

When it is desired to lower the spindle, the hand-wheel is turned in the opposite direction from the arrow indicated in Fig. 2. This unscrews the hub 23 on the threads 14 and thus releases the rotating member 18 from its friction engagement with the shaft 11. This allows the spindle to descend in the base but only at the rate at which the hand-wheel is turned in the direction specified for if the spindle could move faster than the hand-wheel, this movement would cause the shaft 11 to turn faster than the hub 23 which would have the effect of drawing the hub 23 up on the screw again to lock the member 18 to the friction member 13 on the shaft 11. Thus, the spindle can only be lowered as fast as the handle is turned. When the wheel 24 is released after a downward movement of the spindle, the spring 26 instantly turns the hub 23 to lock the rotating member 18 to the shaft 11 and thus to lock the spindle in its then vertical position and prevent its further descent. Thus, all that is necessary to raise or lower the spindle is to take hold of the wheel 24 and turn the same in one direction or the other and when adjusted vertically the spindle is always locked against any descending in the base.

If desired, the table can be raised independently of the wheel 24 by lifting up thereon when the rack 15 and pinion 16 will cause a rotation of the parts in the direction indicated by the arrow in Fig. 2, which movement is permitted by the ratchet and pawl engagement between the members 17 and 18. But no downward movement of the spindle is ever possible except by operating the wheel 24.

It also will be noticed that if the spindle should stick or not move easily down in the base, that the screw 28 in the hub engaging with the leaf spring 26 carried by the shaft as the hand-wheel 24 is rotated in the direction to lower the spindle, gives a positive engagement of the hand-wheel with the pinion and rack whereby power or pressure can be applied to force the spindle downward. Thus the spindle in effect can move positively downward as well as upward.

It also will be noticed when the hub 30 is locked against rotation on the base B by the screws 32 that the spindle is still free to be raised and lowered.

Thus a very simple, safe and convenient means is provided by which vertical adjustment can be made in either direction by simply manipulating one handle.

The details and arrangements herein shown and described may be greatly varied by a skilled mechanic without departing from the scope of the invention as expressed in the claims.

Having thus fully described our invention, what we claim and desire to secure by Letters-Patent is,—

1. In a device of the character described, the combination of a shaft, a member adapted to be raised and lowered by said shaft, two clutch members on said shaft, one rotating and the other non-rotating, the rotating member having a friction engagement with said shaft, an operating hub threaded on said shaft and bearing side-wise on the rotating clutch member, and a flat spring fixed on said shaft in the hub, its free end engaging the hub and continually tending to turn it up on the threads to force the rotating clutch member into frictional engagement with the shaft, whereby said member will be automatically locked when coming down even when not supplied with a load.

2. In a device of the character described, the combination of a shaft, a reciprocating element adjacent thereto and connected therewith, two clutch members having a ratchet engagement with each other, one being held from rotation, a spring pressing the same normally into engagement with the other or rotating member, and normally forcing the rotating member out of frictional engagement with the shaft, and means for forcing the rotatable member into frictional engagement with the shaft.

3. In a device of the character described, the combination of a shaft, operating connections therefrom to the member to be raised and lowered, two clutch members mounted on said shaft having a ratchet engagement with each other, one member being held from rotation and the other having a friction engagement with said shaft whereby the rotatable member can rotate in one direction only when the two clutch members are in engagement, a hub threaded on said shaft and bearing on said rotating clutch member, and a spring carried by said shaft for normally locking the rotating clutch member to said shaft.

4. In a device of the character described, the combination of a hub, a shaft journaled therein, operating connections therefrom to the part to be raised and lowered, a circular non-rotating and a rotating clutch member centrally carried on said shaft and housed in said hub, the rotating clutch member having a friction engagement with said shaft, a hub threaded on the end of said shaft, and a hand-wheel for turning said hub.

5. In a device of the character described, the combination of a hub, a shaft journaled therein, operating connections therefrom to the part to be raised and lowered, non-rotating and rotating clutch members housed in said hub and having clutch faces perpendicular to the axis of the shaft, the rotating clutch member having a friction engagement with said shaft, a hub threaded on the end of said shaft, a spring housed in said hub arranged to turn said hub normally about the shaft to force the rotating clutch member into engagement with said shaft, and a hand-wheel for turning said hub.

6. In a device of the character described, the combination of a shaft, operating connections therefrom to the part to be raised and lowered, an operating wheel, clutch members independent of said wheel having a ratchet engagement with each other, one member being held from rotation and the other having an engagement with said shaft, whereby the latter can rotate in one direction only when the clutch members are in engagement, means located within the operating wheel whereby it is forced to cause a locking engagement between the rotating member and shaft when turned in one direction and to release said rotating member from the shaft when turned in the other direction, and means providing a positive engagement between said wheel and shaft when the rotating clutch member is released from engagement with the shaft.

7. In a device of the character described, the combination of a shaft, a member adapted to be raised and lowered by said shaft, two ratchet clutch members on said shaft, one rotating and the other non-rotating, the rotating member having a friction engagement with said shaft, an operating wheel bearing side-wise on the rotating clutch member, and means for continually tending to force said wheel against the rotating clutch member to force the latter into frictional engagement with the shaft, whereby said member will be automatically locked when coming down even when not supplied with a load.

8. In a device of the character described, the combination of a shaft, operating connections therefrom to the member to be raised and lowered, two clutch members both longitudinally movable on said shaft and adapted to engage each other, a spring for forcing one of the clutch members against the other, one of said clutch members being held from rotation and the other having a friction engagement with said shaft, an operating hub rotatably arranged on said shaft and bearing on said rotating clutch member, and resilient means for normally locking the rotating clutch member to the shaft.

In testimony whereof we have hereunto set our hands, in the presence of two subscribing witnesses.

WILLIAM W. BIRD.
LOUIS W. RAWSON.

Witnesses:
C. F. WESSON,
E. M. ALLEN.

Copies of this patent may be obtained for five cents each, by addressing the "Commissioner of Patents, Washington, D. C."